United States Patent
Homan et al.

(10) Patent No.: US 11,520,070 B2
(45) Date of Patent: Dec. 6, 2022

(54) EFFECTIVE MEDIUM THEORY OF ACIDIZED CARBONATE MATRIX RESISTIVITY EMPLOYED TO CALCULATE THE APPARENT GEOMETRIC PARAMETERS OF THE WORMHOLES

(71) Applicant: SCHLUMBERGER TECHNOLOGY CORPORATION, Sugar Land, TX (US)

(72) Inventors: Dean Homan, Damon, TX (US); John Rasmus, Richmond, TX (US); Gallyam Aidagulov, Dammam (SA); Harold Pfutzner, Richmond, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 866 days.

(21) Appl. No.: 16/265,613

(22) Filed: Feb. 1, 2019

(65) Prior Publication Data
US 2019/0235122 A1    Aug. 1, 2019

Related U.S. Application Data

(60) Provisional application No. 62/625,038, filed on Feb. 1, 2018.

(51) Int. Cl.
*G01V 3/20* (2006.01)
*G01V 3/38* (2006.01)
(Continued)

(52) U.S. Cl.
CPC ............ *G01V 3/38* (2013.01); *E21B 43/26* (2013.01); *E21B 49/00* (2013.01); *G01V 3/20* (2013.01); *G01V 3/28* (2013.01)

(58) Field of Classification Search
CPC ... G01V 3/38; G01V 3/20; G01V 3/28; G01V 3/02; E21B 43/26; E21B 49/00;
(Continued)

(56) References Cited

U.S. PATENT DOCUMENTS

| 6,749,022 B1 * | 6/2004 | Fredd ................. C09K 8/72 166/250.1 |
| 7,657,415 B2 * | 2/2010 | Panga ................. E21B 43/25 703/12 |

(Continued)

FOREIGN PATENT DOCUMENTS

| FR | 3036518 A1 * | 11/2016 | ............ G01V 99/00 |
| WO | WO 2015013697 A1 * | 1/2015 | ............ E21B 43/25 |

OTHER PUBLICATIONS

US-20150285045-A1, short version, Oct. 2015.*
(Continued)

*Primary Examiner* — Kandasamy Thangavelu

(57) ABSTRACT

Methods may include emplacing a resistivity logging tool in a borehole; stimulating an interval of the formation in the borehole; obtaining at least one resistivity log of the interval of the formation, wherein the resistivity log comprises a survey of one or more depths into the formation; determining a radial invasion of the stimulating fluid into the interval of the formation; and inverting the radial invasion to obtain an input and entering the input into an effective medium model; solving the effective medium model and generating an effective wormhole radius profile and thickness for the interval of the formation.

18 Claims, 8 Drawing Sheets

(51) Int. Cl.
*E21B 49/00* (2006.01)
*E21B 43/26* (2006.01)
*G01V 3/28* (2006.01)

(58) Field of Classification Search
CPC ......... E21B 43/25; E21B 43/14; G01N 33/24; G06N 7/00
See application file for complete search history.

(56) References Cited

U.S. PATENT DOCUMENTS

| | | | | |
|---|---|---|---|---|
| 9,529,112 | B2 | 12/2016 | Qiu et al. | |
| 2011/0024115 | A1* | 2/2011 | Brice | C09K 8/508 166/294 |
| 2015/0285045 | A1* | 10/2015 | Ziauddin | E21B 43/25 166/305.1 |
| 2015/0293255 | A1* | 10/2015 | Qiu | G01N 33/24 324/339 |
| 2015/0345267 | A1* | 12/2015 | Modavi | E21B 43/25 166/271 |
| 2016/0024914 | A1* | 1/2016 | Ghommem | E21B 43/26 166/254.2 |
| 2016/0025895 | A1* | 1/2016 | Ziauddin | E21B 43/25 702/11 |
| 2016/0178787 | A1* | 6/2016 | Le | G01V 3/28 702/7 |
| 2018/0202264 | A1* | 7/2018 | Sarduy | G06N 7/00 |
| 2019/0003298 | A1* | 1/2019 | Stolyarov | E21B 43/14 |

OTHER PUBLICATIONS

US-20150293255-A1 short version, Oct. 2015.*
US-20150345267-A1 short version, Dec. 2015.*
US-20160178787-A1, short version, Jun. 2015.*
US-20190003298-A1, short version, Jan. 2019.*
US-20180202264-A1, short version, Jul. 2018.*
US-20160025895-A1, short version, Jan. 2016.*
U.S. Pat. No. 7,657,415-B2, short versionFeb. 2010.*
Barber, T. D. et al., "Interpretation of Multiarray Induction Logs in Invaded Formations at High Relative Dip Angles", SPWLA, 1999, 40(3), pp. 202-217.
McDuff, D. R. et al., "Understanding Wormholes in Carbonates: Unprecedented Experimental Scale and 3-D Visualization", SPE-134379-MS, presented at the SPE Annual Technical Conference and Exhibition, Florence, Italy, 2010, 9 pages.
Rasmus, J. C. et al., "An Improved Petrophysical Evaluation of Oomoldic Lansing-Kansas City Formations Utilizing Conductivity and Dielectric Log Measurements", paper V, presented at the 26th Annual Logging Symposium, 1985, SPWLA, 19 pages.
Sen, P. N., et al., "Self-similar model for sedimentary rocks with application to the dielectric constant of fused glass beads", Geophysics, 1981, 46(5), pp. 781.

* cited by examiner

FIG. 1.1
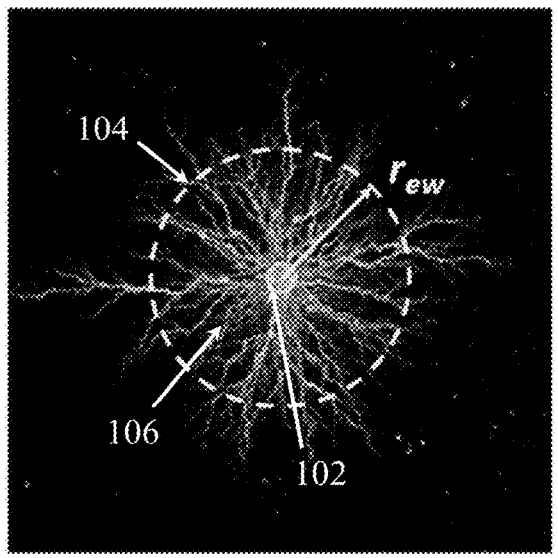
FIG. 1.2
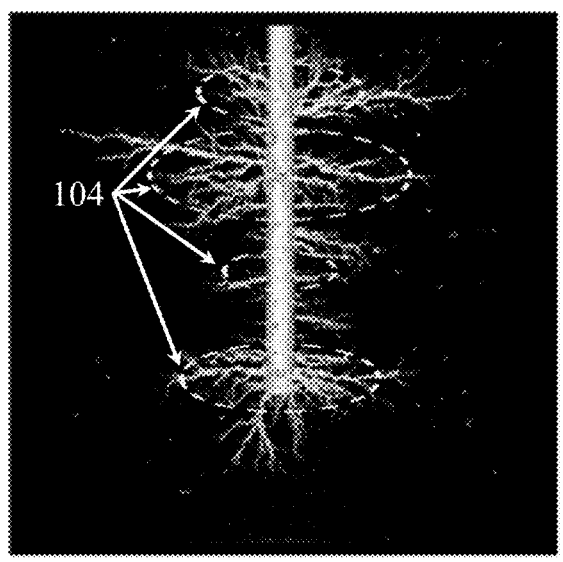

FIG. 3.1
FIG. 3.2
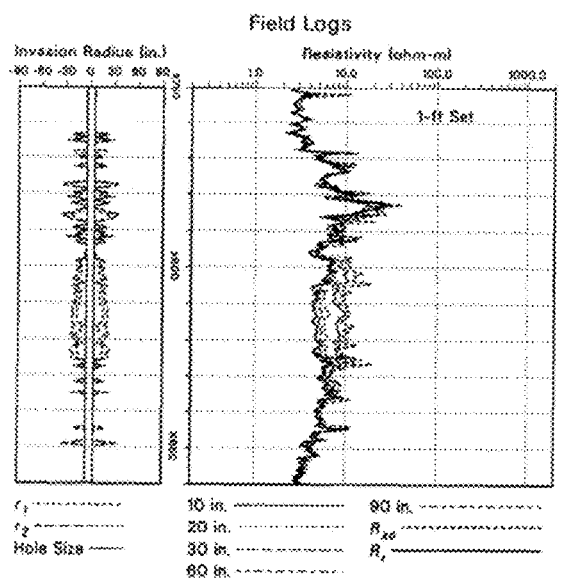
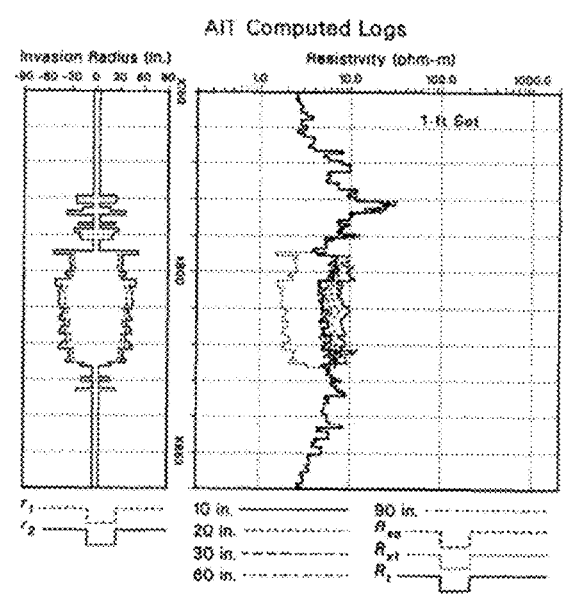

FIG. 6.1
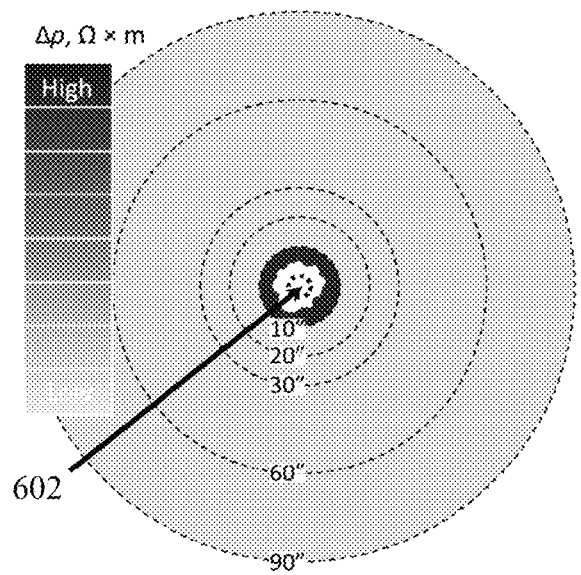
FIG. 6.2
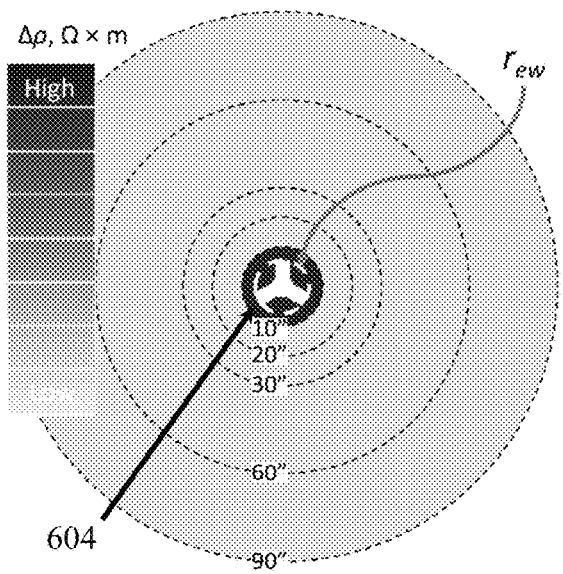
FIG. 6.3
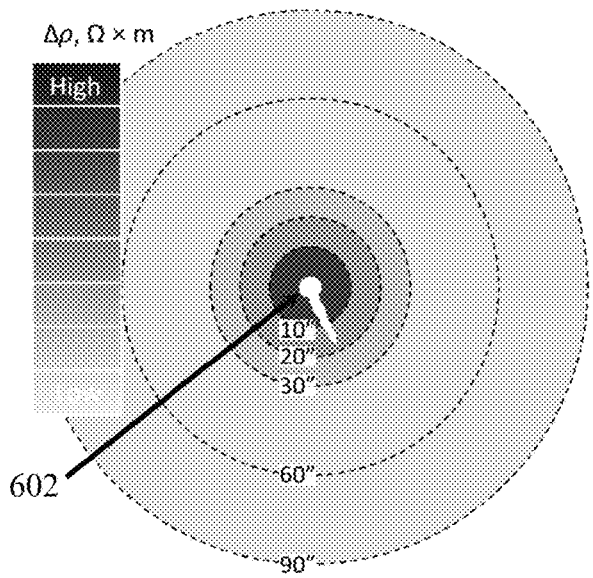
FIG. 6.4
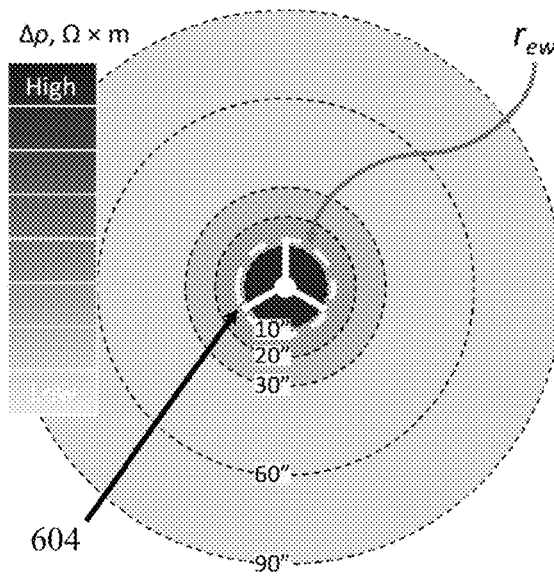

FIG. 6.5
FIG. 6.6
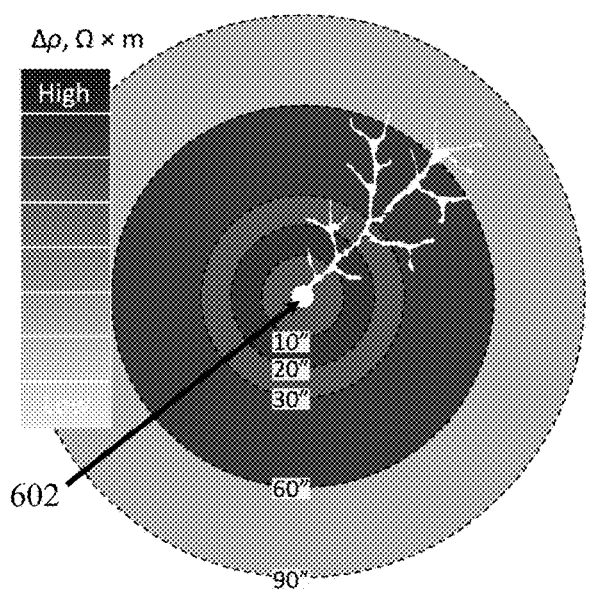
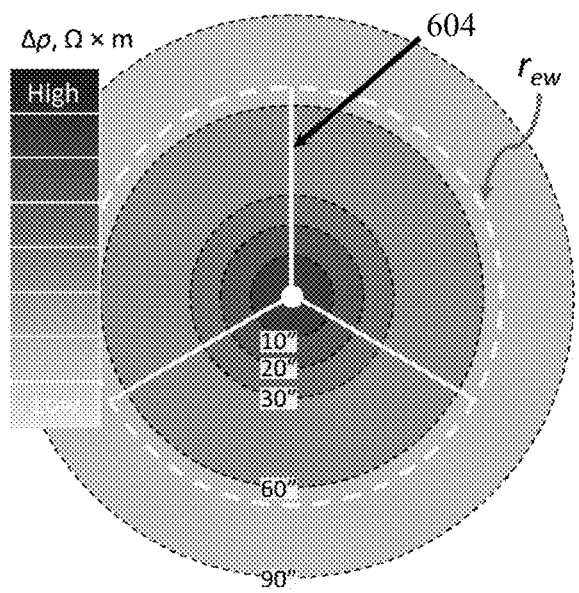

EFFECTIVE MEDIUM THEORY OF ACIDIZED CARBONATE MATRIX RESISTIVITY EMPLOYED TO CALCULATE THE APPARENT GEOMETRIC PARAMETERS OF THE WORMHOLES

CROSS-REFERENCE TO RELATED APPLICATIONS

This application claims the benefit of priority under 35 U.S.C. 119(e) to U.S. Provisional Patent Application No. 62/625,038, filed Feb. 1, 2018, the entire contents of which are incorporated herein by reference.

BACKGROUND

The rate of oil recovery from hydrocarbon reservoirs is governed by the interplay of viscous and capillary forces that determine the fluid transport in porous media, and a number of enhanced recovery techniques have been devised to increase the rate and completeness of fluid transport. Well stimulation often includes the use of chemical agents such as acids and other materials that restore or enhance permeability of the reservoir following damage to the near-borehole area following drilling and fracturing operations. As stimulating fluids are injected into the formation, reactive rock (often carbonates) undergo dissolution reactions that produce highly permeable channels or "wormholes" that enable fluid transport through the formation. Successful stimulation is often characterized by the production of dominant wormholes that may have some degree of branching but extend into the reservoir and consume minimal amounts of injected stimulating fluids.

Although stimulation is relatively common, the evaluation of the treatment process and recovery enhancement is difficult to characterize. Some common parameters monitored during a stimulating treatment include injection pressure, injection rate, downhole pressures, and distributed temperature, which can be related to the extent of formation reaction with the treatment. However, techniques such as temperature monitoring are unreliable in many circumstances, and improper stimulation and zonal coverage may not be discovered until the production phase, when remediation is expensive and time consuming. It is important to be able to assess treatment efficiency during treatment operations to maximize zonal coverage, and to optimize the efficiency of the applied stimulating treatments based on the formation properties encountered at a given injection site.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to methods that may include emplacing a resistivity logging tool in a borehole; stimulating an interval of the formation in the borehole; obtaining at least one resistivity log of the interval of the formation, wherein the resistivity log comprises a survey of one or more depths into the formation; determining a radial invasion of the stimulating fluid into the interval of the formation; and inverting the radial invasion to obtain an input and entering the input into an effective medium model; solving the effective medium model and generating an effective wormhole radius profile and thickness for the interval of the formation.

In another aspect, embodiments disclosed herein relate to emplacing a resistivity logging tool in a borehole; stimulating an interval of the formation; logging resistivity with the resistivity logging tool at a depth of interest from a first time point to a second time point during stimulating the interval of the formation; determining a radial invasion of the stimulating fluid into the interval of the formation; inverting the radial invasion to obtain an input and entering the input into an effective medium model; and solving the effective medium model and generating an effective wormhole radius profile and thickness along the interval of the formation.

In another aspect, embodiments disclosed herein relate to systems that include a resistivity logging tool disposed in a borehole during a stimulating operation; a processor carried on the logging tool configured to: log resistivity with the resistivity logging tool at a depth of interest from a first time point to a second time point during stimulating the interval of the formation; determine a radial invasion of the stimulating fluid into the interval of the formation; invert the radial invasion to obtain an input and entering the input into an effective medium model; and solve the effective medium model and generate an effective wormhole radius and thickness for the interval of the formation.

Other aspects and advantages of the claimed subject matter will be apparent from the following description and the appended claims.

BRIEF DESCRIPTION OF DRAWINGS

FIGS. 1.1 and 1.2 are illustrations depicting alternative aspects of the effective radius of wormholes extending from a borehole in accordance with embodiments of the present disclosure;

FIGS. 3.1 and 3.2 are graphical representations showing a typical invasion output for a resistivity tool in accordance with the present disclosure;

FIGS. 6.1-6.6 are graphical representations showing resistivity measurements from an array induction tool in accordance with embodiments of the present disclosure.

DETAILED DESCRIPTION

Figure 2:
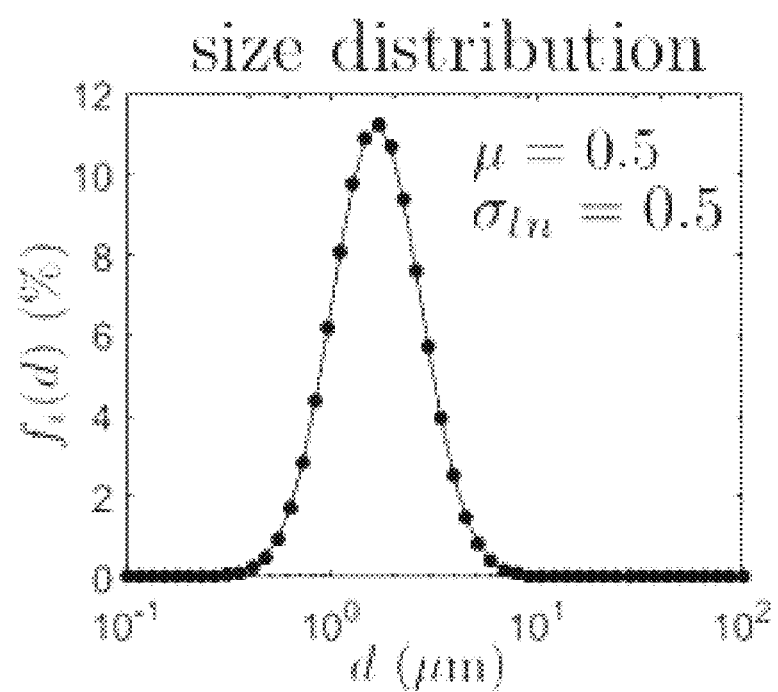
FIG. 2 is a graphical representation showing the effective volume fraction as a function of wormhole diameter in accordance with embodiments of the present disclosure.

In one aspect, embodiments disclosed herein relate to methods to assess the structure of wormhole networks in a formation from resistivity information obtained from one or more borehole tools. In one or more embodiments, stimulation operations are performed within a borehole and resistivity measurements made with the resistivity tool before, during, and/or after the stimulation operations are analyzed to characterize wormhole distribution and/or penetration into the formation. In some embodiments, methods may be adapted to monitor propagation, radial depth, width and number of wormholes in a formation subject to stimulation operations to quantify the effectiveness of stimulating treatments.

Methods in accordance with the present disclosure may use one or more of a variety of resistivity measurements, including propagation, laterolog, or induction resistivity of radial invasion, to evaluate the effective parameters of wormholes created during a stimulation treatment in carbonate and reactive formations. Using the Maxwell-Garnett effective medium theory, the effective parameters of the wormhole can be related to the inverted radial invasion resistivity. In one or more embodiments, image logs may be used to quantify the number of wormhole initiations per unit of borehole stimulated length. In some embodiments, mud resistivity measurements may be used to constrain the effective medium model-based inversion.

Borehole stimulating treatments utilize acids, chelants, and other compounds to dissolve carbonate and other reactive rocks to generate cavities and wormholes that increase the mobility of hydrocarbon fluids through the formation and into the borehole during production. At certain injection rates, stimulating fluids react with the formation, generating wormholes that form networks in the near borehole region. The formation of wormhole networks by acidization in an openhole well is illustrated in FIGS. 1.1 and 1.2, which show alternative views of an X-ray computed tomography image of a carbonate formation sample undergoing acidization at laboratory scale. As the acid is injected into the sample, developing wormholes produce conductive paths that increase fluid transport through the formation sample. With respect to FIG. 1.1, an axial view of a network of wormholes 106 emanating from borehole 102 is shown.

While resistivity tools may have insufficient spatial resolution to resolve the depth and width of individual wormholes, the tools may be adapted to provide average and bulk estimates of wormhole geometries. In one or more embodiments, wormhole networks may be characterized using the effective radius, $r_{ew}$, of the wormhole zone to describe the distribution of volume of dissolved formation around the borehole, which is shown as dashed circle 104 in FIG. 1.1. Being an average quantity, the effective wormhole radius serves as an indicator that can differentiate zones along wellbore 102 having different wormhole penetration depths, as shown in FIG. 1.2.

In one or more embodiments, methods may also characterize intervals of a borehole by overall wormhole geometry to identify those zones having preferred wormhole geometries that are correlated to increased production efficiency. For example, monitoring the effective wormhole radius during the matrix stimulation allows an operator to adjust the job parameters in favor of dominant wormholes that extend from the borehole with various degrees of branching and tapering to increase penetration depth, reservoir contact, and hydrocarbon recovery.

Methods in accordance with the present disclosure utilize resistivity measurements to characterize wormhole formation and growth by approximating the reacting formation as permeable zones having an inclusion volume filled with acid reaction products of extremely low electric resistivity. Resistivity has greater penetration depth than a number of other measurement techniques and may be tuned to probe individual depths to determine the extent of wormhole formation in a surrounding formation.

Previous resistivity-based approaches to monitor stimulation operations and estimate enhancements in production often utilize indirect measurements such as acid volume and injection pressure, with some approaches utilizing models and simulations based on relationships that assume uniform pore sizes, such as the Archie equation to determine water saturation of uninvaded zones in the near-borehole region. Archie-based techniques match resistivity response obtained from downhole tools for the dissolved volume in the formation but assume that the empirical Archie relationships are valid for discrete inclusions such as wormholes. Because the Archie equation assumes uniform pore volume distributions, the technique is susceptible to error and has limits on the degree to which the method can distinguish various wormhole patterns. In contrast, methods in accordance with the present disclosure utilize the Maxwell-Garnett effective medium theory to approximate solutions to Maxwell's equations, which provides some measure to match resistivity response to an underlying wormhole network structure.

Maxwell-Garnett Effective Medium Theory

Methods in accordance with the present disclosure may use the Maxwell-Garnett effective medium theory to quantify apparent geometric parameters of wormholes such as the effective wormhole radius. Previous approaches have adapted Maxwell-Garnett mathematical relationships to model the dielectric properties of mixtures of rock grains and brine, while other approaches have modeled low frequency conductivity in oomoldic porosity rocks containing secondary spherical conductive voids that are larger scale than diameters associated with intergranular porosity as discussed in W. E. Kenyon, and Rasmus, J. C., 1985, An Improved Petrophysical Evaluation of Oomoldic Lansing-Kansas City Formations Utilizing Conductivity and Dielectric Log Measurements: 26th Annual Logging Symposium, SPWLA, Paper V, p. 19.

Methods in accordance with the present disclosure adapt approaches for determining oomoldic porosity to consider the case of wormholes generated in formation rock by stimulation treatment fluids. In one or more embodiments, wormholes may be approximated by radially directed geometric volumes, such as cylinders or cones, disseminated in a homogeneous manner at the borehole wall.

In one or more embodiments, Maxwell-Garnett relationships are extended to geometric volume inclusions and utilized to model the low frequency induction or laterolog resistivity response of wormhole approximations extending randomly and azimuthally from a borehole wall over a vertical section of a formation. Methods in accordance with the subject disclosure adapt the approach of Kenyon and Rasmus that modeled low frequency conductivity response of a mixture of brine-filled cylindrical volumes imbedded in a host material to approximate wormhole networks. The original expression for spherical volumes is set forth in Eq. (1), where $\sigma_t$ is the conductivity of the mixture, $\sigma_h$ is the conductivity of the host rock, $\sigma_i$ is the conductivity of the inclusions in the rock, and $V_i$ is the volume fraction of the cylindrical inclusions.

$$\sigma_t = \sigma_h \left[ \frac{1 + \frac{1}{2} V_i \left( \frac{\sigma_i - \sigma_h}{\sigma_i + 2\sigma_h} \right)}{1 - V_i \left( \frac{\sigma_i - \sigma_h}{\sigma_i + 2\sigma_h} \right)} \right] \tag{1}$$

Methods in accordance with the present disclosure set $\sigma_t$ equal to the inverse of the invaded resistivity $R_{xo}$ obtained from resistivity logs that include propagation, laterolog, and induction logs. The inclusion or rod volume fraction at $t=\infty$ is given by Eq. 2, where N is the total effective number of wormholes (approximated as cylinders), $a_j(t)$ is the effective radius of the $j^{th}$ wormhole (wormhole thickness), $r_{xo}$ is the effective wormhole length (penetration depth into the formation), $r_{BH}(t)$ is the borehole radius (that may increase with stimulation), L(t) is the length of the stimulated section, and t is the time between $t_0 \le t \le t_f$, where $t_f$ is a time after all the acid has reacted with the formation rock.

$$V_i(t) = \sum_{j=1}^{N} \frac{\pi a_j^2 (r_{x0} - r_{BH})}{\pi (r_{x0}^2 - r_{BH}^2) L(t)} = \frac{1}{L(t)(r_{x0} + r_{BH})} \sum_{j=1}^{N} a_j^2(t) \quad (2)$$

Monitoring resistivity during the stimulation process may be used to estimate the wormhole volume as a function of time as shown in Eq. 2. In some embodiments, the percent volume, temperature, and pressure of the stimulating fluid in the borehole could also provide information regarding the reaction volume for a given rock type and place an upper bound on the wormhole volume.

Instead of assuming a specific radius for the wormholes in a given formation interval, wormholes can be treated as an ensemble with a diameter distribution rather than choosing a specific radius, where $d_j = 2a_j$. As is often the case when simulating natural growth processes, a log normal distribution for $d_j$, $j=1, \ldots, N$ may be chosen to arrive at the expression for the distribution of wormholes shown in Eq. 3, where PDF is the probability density function, p is the mean: 0.5, and $\sigma_{ln}$ is the natural log of the standard deviation: 0.5.

$$PDF(\ln d_j(t_f); \mu, \sigma) = \frac{1}{\sigma_{ln} \sqrt{2\pi}} \exp\left[-\frac{(\ln d_j(t_f) - \mu)^2}{2\sigma_{ln}^2}\right] \quad (3)$$

Within a formation, wormholes generated through stimulation exhibit a range of diameters. With respect to FIG. 2, an example of a fraction distribution of wormhole diameters is shown. In order to capture the naturally occurring distribution of wormhole diameters, the volume fraction is multiplied by the diameter distribution to obtain the effective volume fraction, defined as $f_i = V_i PDF$.

The conductivity of the host rock can be modeled by the Archie relationship shown in Eq. 4, where $\sigma_h$ is the conductivity of the host rock, $\phi_{ig}$ is the intergranular pore volume of the host rock, $m_{ig}$ is the cementation exponent of the intergranular pore volume, $S_{wig}$ is the intergranular water saturation, and $n_{ig}$ is the saturation exponent of the intergranular pore volume.

$$\sigma = \frac{\sigma_{ig}^{m_{ig}} S_{wig}^{n_{ig}}}{R_w} \quad (4)$$

On the other hand, the conductivity of the wormhole inclusion can be modeled by the conductivity of an open volume as shown in Eq. 5, where $\sigma_i$ is the conductivity of the wormhole inclusion, $R_t$ is the resistivity of residual acidic water, and $S_{wi}$ is the water saturation of the wormhole.

$$\sigma_i = \frac{S_{wv}}{R_{acid}} \quad (5)$$

A typical invasion output for a resistivity tool is shown in FIGS. 3.1 and 3.2. With respect to FIG. 3.1, a wireline array induction field log output from an array induction tool (AIT) is shown as obtained from an Alaskan well. FIG. 3.1 shows invasion in the pay zone derived from the AIT 4-parameter inverse. With respect to FIG. 3.2, a modeled wireline array induction log confirming annulus invasion in the pay zone is shown. The annulus of conductivity for FIG. 3.2 is approximately the same as that for FIG. 3.1. In these figures, the invasion radius and the invasion resistivity, $R_{xo}$, are to be used as an input to the effective medium model of the tool response $\sigma_t = 1/R_{xo}$. However, tools having similar output parameters may be inverted and used, such as laterolog or propagation tools.

Figure 4:
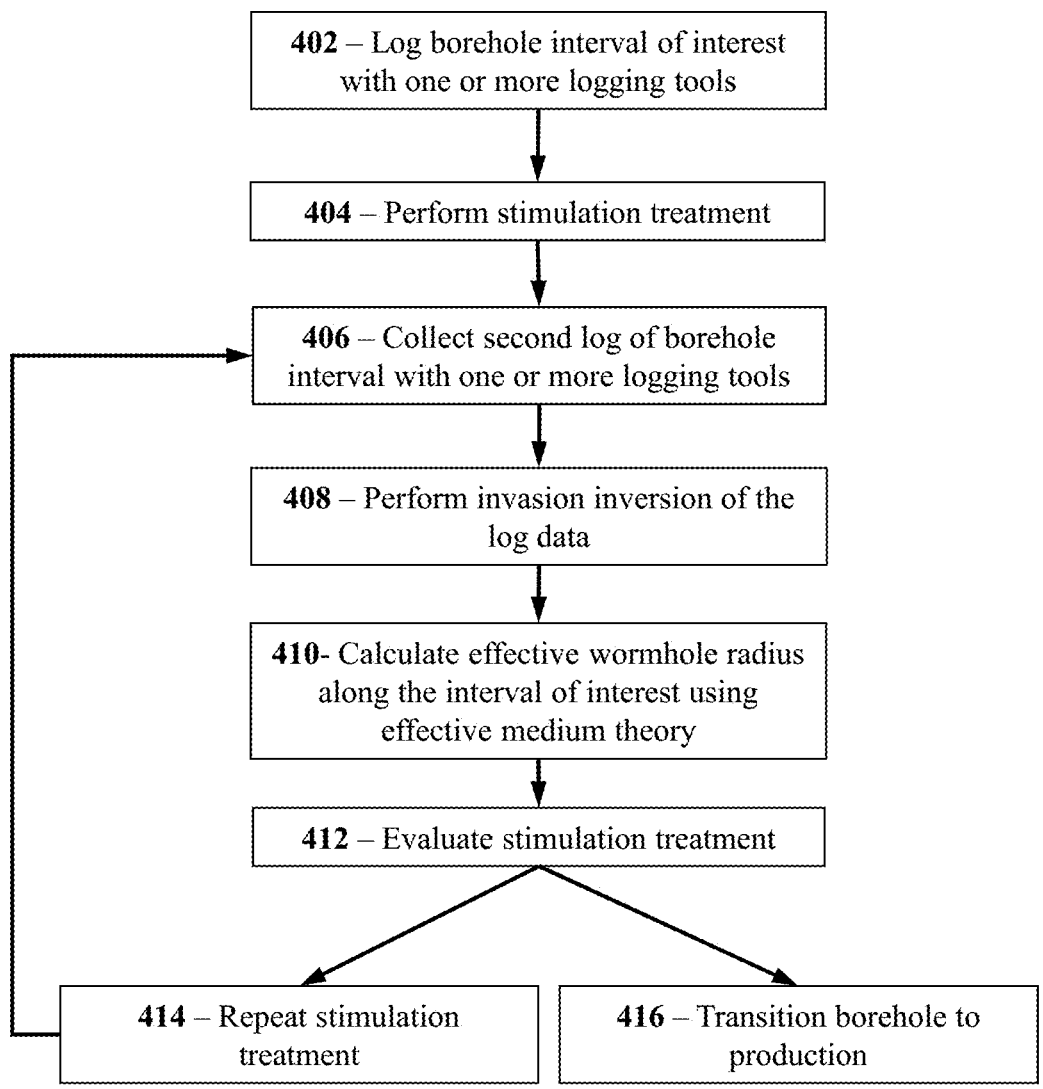
FIG. 4 is a flow diagram depicting a method in accordance with embodiments of the present disclosure.
Figure 5:
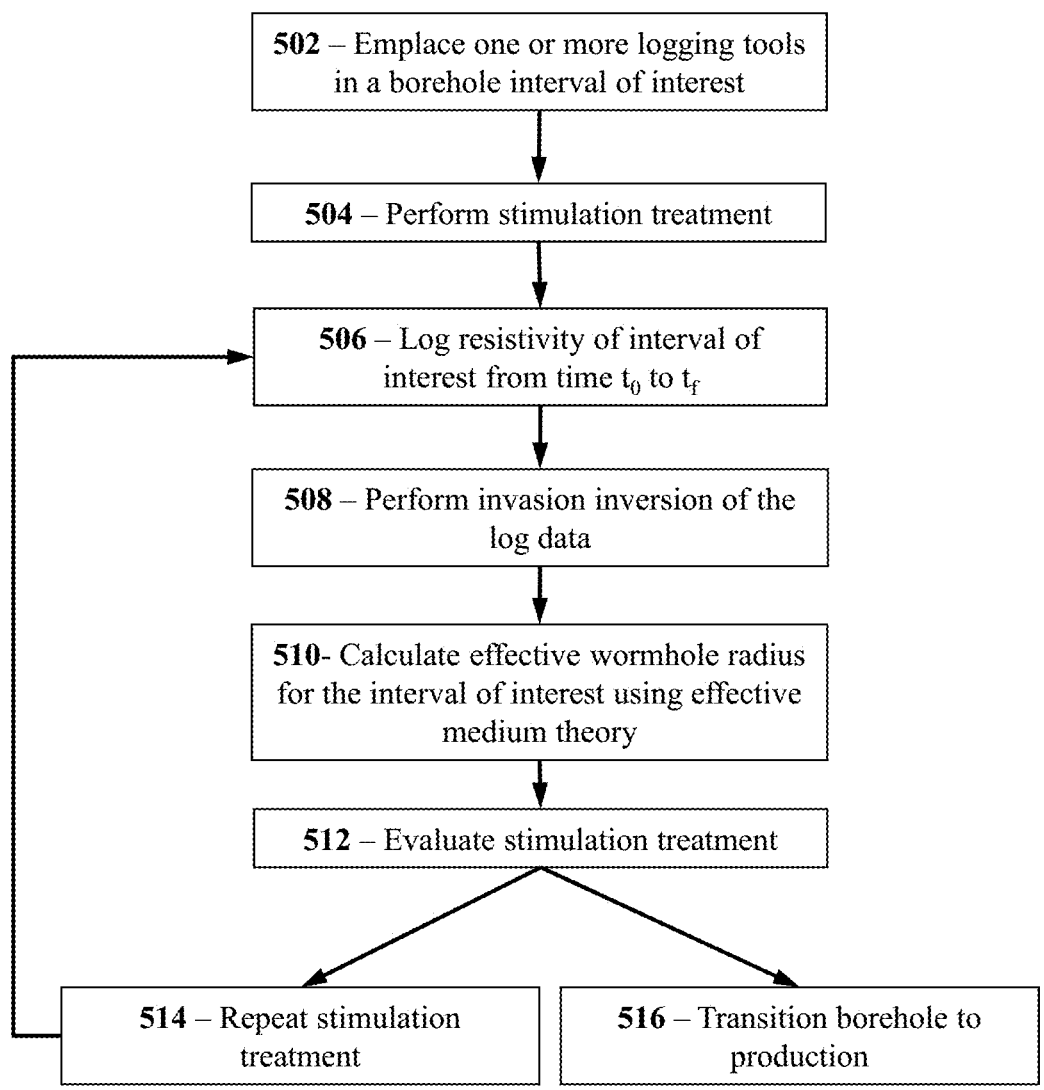
FIG. 5 is a flow diagram depicting a method in accordance with embodiments of the present disclosure.

Sample workflows for methods in accordance with the present disclosure are shown in FIG. 4 as a stationary measurement and FIG. 5 as a continuous measurement. With respect to FIG. 4, a flow chart for characterizing the effectiveness of a stimulating treatment using stationary measurements is shown. At 402, a borehole interval of interest is characterized with one or more logging tools to generate a resistivity log. Logging tools may be emplaced within the borehole using any suitable technique such as run in on a drillstring or on coiled tubing.

Stimulation of the borehole is then initiated by injecting stimulating fluids into the borehole at 404 to initiate wormhole formation and propagation. In one or more embodiments, logging tools may be run into the borehole prior to stimulation operations, at which time the initial log of the formation is collected. The logging tool or tools may remain within the borehole, while stimulating treatments are subsequently pumped in. The tool may be isolated from the treated interval during stimulation in some embodiments, using packers and other diverting equipment, or may remain within the interval during stimulating treatments in some embodiments.

At 406, the interval is characterized following stimulation using one or more logging tools. Logging tools used at this step may be the same tools used at step 402, or additional tools emplaced within the borehole. The borehole data obtained at 402 and 406 is then converted into an invasion radius $r_{xo}$ and the invasion resistivity $R_{xo}$ which is then inverted at 408. The invasion radius provides an indication of the radial depth of the wormhole into the formation. In one or more embodiments, an imager tool such as formation microimager may be used to collect direct images of wormholes starting points at the borehole wall. Borehole images may then be used to get an average wormhole diameter as a function of well depth that may be used as a boundary condition to constrain the inversion. In some embodiments, additional estimates of wormhole diameter may be obtained from other complementary techniques to resistivity such as gamma-ray or neutron measurements. At 410, the inverted invasion data is then used in conjunction with the effective medium theory to calculate one or more effective wormhole radii along the interval of interest.

In one or more embodiments, the effective wormhole radii are used to evaluate the result of the stimulation treatment at 412. An operator may then consider whether to repeat the stimulation treatment or modify the applied treatment at 414, followed by repeating the evaluation steps 406-412; or, if the stimulation was satisfactory, proceed to transition the well to production at 416.

Alternatively, measurements may be conducted continuously in real-time to study the resistivity response over time and the changing reaction rates with formation rock (calcite, for example) as the wormhole grows and then stops. Continuous measurements may also allow operators to view the effects of the stimulating treatment on wormhole propagation in real time and make changes in composition or rate of the injected stimulating treatment to modify the observed reaction rate. A flow diagram depicting a real-time method is shown in FIG. 5.

At 502, a logging tool is emplaced within a borehole interval of interest and characterized with one or more logging tools to generate a resistivity log. Logging tools may be emplaced within the borehole using any suitable technique such as run in on a drillstring or on coiled tubing. Stimulation of the borehole is initiated by injecting stimulating fluids into the borehole at 504 to initiate wormhole formation and propagation.

While much of the method depicted in FIG. 5 is similar to the method depicted in FIG. 4, the key difference is the continuous monitoring of the resistivity from an initial time to $t_0$ a final time $t_f$ at 506. Logging tools used at this step may be the same tools used at step 502, or additional tools emplaced within the borehole. The borehole data obtained at 502 and 506 is then converted into an invasion radius and an invasion resistivity, which is then inverted at 508. At 510, the inverted invasion data is then used in conjunction with the effective medium theory to calculate one or more effective wormhole radii along the interval of interest.

In one or more embodiments, the effective wormhole radii are used to evaluate the result of the stimulation treatment at 512. An operator may then consider whether to repeat the stimulation treatment or modify the applied treatment at 514, followed by repeating the evaluation steps 506-512; or, if the stimulation was satisfactory, proceed to transition the well to production at 516.

Example: Determining Wormhole Dissolution Type

In this example, the effective wormhole radius is calculated for three different formations exhibiting various dissolution types, which may take place during matrix stimulation: face dissolution, conical wormhole formation, and dominant wormhole formation. While the method is illustrated using an array induction imager logging tool, other tools capable of measuring resistivity and invasion radii within a borehole may be used as discussed above.

Methods in accordance with the present disclosure include the determination of an effective wormhole radius, $r_{ew}$, which may effectively describe the depth of wormhole penetration across different dissolution patterns. With respect to FIGS. 6.1-6.6, grayscale plots are shown for each of the three dissolution types—FIG. 6.1 shows face dissolution; FIG. 6.3 shows conical wormhole formation; and FIG. 6.5 shows dominant wormhole formation with branching. Also shown are corresponding estimated effective wormhole radius, $r_{ew}$, for each case—FIG. 6.2 for face dissolution; FIG. 6.4 for conical wormhole formation; and FIG. 6.6 for dominant wormhole formation.

Each figure includes five concentric circular zones corresponding to the five DOIs: 10, 20, 30, 60 and 90 inches for the standard (i.e., non-modular) AIT. In FIGS. 6.1-6.6 these DOIs are shown with black dashed circles scaled with respect to the 7.5 inch" diameter borehole shown as centermost circle 602. The legend in each figure indicates the degree of resistivity change Δρ in the signal before and after stimulation as a change in grayscale. One can easily see that grayscale patterns are significantly different for different dissolution patterns, though of comparable volume. The contrast between the patterns indicates that the dissolution patterns can be distinguished by an AIT.

In one or more embodiments, dissolution patterns that produce wormholes within the near-borehole region may be approximated using relatively simple geometrical shapes, which enable parametrization and determination of $r_{ew}$ from a tool response. In this example, the effective wormhole radius is established by approximating wormholes generated in a select interval of a borehole as a set of N cylinders emanating radially from the borehole, shown as white lines 604 in FIGS. 6.2, 6.4, and 6.6, for a case in which N=3. The number, length, and shape of approximated cylinders (or other geometric shapes) become parameters of the model for tool response, such as an AIT response in this example. A solution for this geometry can be obtained by extending the Maxwell-Garnett solution by assuming wormholes as inclusions of a defined three-dimensional shape such as cylinders, cones, and the like, which allows for an easy solution for the AIT response.

The example above using cylindric approximations of wormholes within the formation do not provide accurate estimates of productivity or injectivity enhancements without more detailed geometric approximations of wormhole branching and additional information regarding fluid viscosity and rock permeability. However, as illustrated in the diagrams, $r_{ew}$ reflects the depth that wormholes extend into the formation, which may be used to differentiate zones along the borehole with different wormhole depths. This information may be used to adjust treatment parameters, such as stimulating fluid composition and injection pressure, to optimize the production of deeper wormholes.

In one or more embodiments, an empirical correlation may be established between the generated effective wormhole radius and productivity enhancement for the formation, which may then be used to estimate a productivity enhancement from the applied stimulating treatment. In some embodiments, empirical correlations may be generated for a given reservoir formation between $r_{ew}$ and productivity/injectivity enhancement, which can be applied to other wells within the same or similar formation. In still other embodiments, productivity or injectivity enhancements may also be estimated by determining the effective wormhole radius $r_{ew}$ using geometric shapes that approximate the geometry of wormhole branching with greater detail, which may be combined with fluid viscosity and rock permeability data to derive more accurate estimates of production enhancement.

Applications

In one or more embodiments, methods may include obtaining one or more borehole logs before, during, and/or after a stimulation job. In some embodiments, continuous measurements of resistivity changes during the injection of a stimulation treatment may be used to detect the geometry of ambiguously shaped wormholes in cases when stimulating fluids diffuse around the wormhole. Methods in accordance with the present disclosure may be used to optimize parameters during stimulation, enabling operators to make real-time changes to increase stimulation efficiency and enhance overall recovery.

In one or more embodiments, methods in accordance with the present disclosure may be conducted on a single trip of a tool string. For example, a tool string incorporating a device for collecting resistivity data may be run into a borehole while measuring to generate the initial formation characterization. Stimulation operations may be performed, and the tool string may then be withdrawn while measuring to generate a second resistivity log of the stimulated formation and any associated wormholes. Methods in accordance with the present disclosure may evaluate wormhole formation from resistivity measurements acquired with commercially available tools from SCHLUMBERGER™ such as ARC™, HRLA™ or array induction tool (AIT™). In one or more embodiments, methods may incorporate FMI™ logs to determine the number of wormhole initiations created during the stimulation.

In one or more embodiments, methods may utilize measurements from one or more downhole logging tools, including the incorporation of complementary tools and techniques to determine relevant formation parameters such as pore diameter, pore volume, and inclusion volume. Methods in accordance with the present disclosure may utilize resistivity measurements in conjunction with a number of other possible techniques such as acoustic tools, dielectric tools, gamma ray tools, neutron tools, and the like. The use of complementary measurements may be used to enhance the accuracy of near borehole measurements in some embodiments, allowing for the extrapolation and correction of resistivity data from deeper in the formation. In some embodiments, initial measurements may be obtained from a target well prior to stimulation, or an effective wormhole radius may be generated using various assumptions and/or data obtained from a pilot well, lateral wells, or from wells created in similar formations.

Computing System

Figure 7:
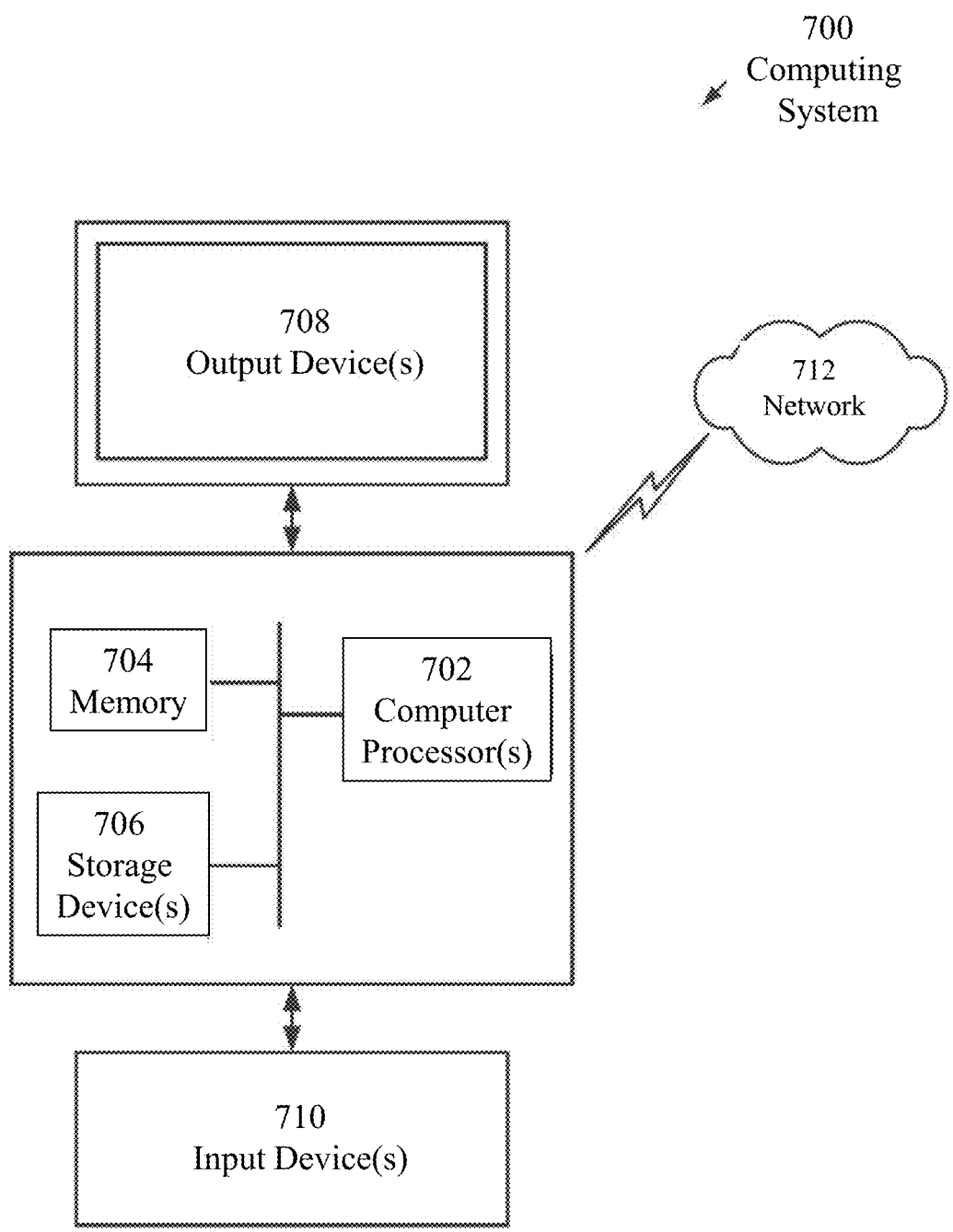
FIG. 7 is a schematic showing an example of a computer system for executing methods in accordance with the present disclosure.

Embodiments of the present disclosure may be implemented on a computing system. Any combination of mobile, desktop, server, embedded, or other types of hardware may be used. For example, as shown in FIG. 7, the computing system (700) may include one or more computer processor(s) (702), associated memory (704) (e.g., random access memory (RAM), cache memory, flash memory, etc.), one or more storage device(s) (706) (e.g., a hard disk, an optical drive such as a compact disk (CD) drive or digital versatile disk (DVD) drive, a flash memory stick, etc.), and numerous other elements and functionalities. The computer processor(s) (702) may be an integrated circuit for processing instructions. For example, the computer processor(s) may be one or more cores, or micro-cores of a processor configured to perform methods described above, including solving an effective medium model and generating an effective wormhole radius profile and thickness for the interval of the formation.

The computing system (700) may also include one or more input device(s) (710), such as a touchscreen, keyboard, mouse, microphone, touchpad, electronic pen, or any other type of input device. Further, the computing system (700) may include one or more output device(s) (708), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (700) may be connected to a network (712) (e.g., a local area network (LAN), a wide area network (WAN) such as the Internet, mobile network, or any other type of network) via a network interface connection (not shown). The input and output device(s) may be locally or remotely (e.g., via the network (712)) connected to the computer processor(s) (702), memory (704), and storage device(s) (706). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the disclosure. Further, one or more elements of the aforementioned computing system (700) may be located at a remote location and connected to the other elements over a network (712).

Further, embodiments of the disclosure may be implemented on a distributed system having a plurality of nodes, where each portion of the disclosure may be located on a different node within the distributed system. In one embodiment of the disclosure, the node corresponds to a distinct computing device. Alternatively, the node may correspond to a computer processor with associated physical memory. The node may alternatively correspond to a computer processor or micro-core of a computer processor with shared memory and/or resources.

Although only a few examples have been described in detail above, those skilled in the art will readily appreciate that many modifications are possible in the examples without materially departing from this subject disclosure. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112 (f) for any limitations of any of the claims herein, except for those in which the claim expressly uses the words 'means for' together with an associated function.

What is claimed:

1. A method, comprising:
   emplacing a resistivity logging tool in a borehole;
   stimulating an interval of a formation in the borehole;
   obtaining at least one resistivity log of the interval of the formation, wherein the resistivity log comprises a survey of one or more depths into the formation;
   determining a radial invasion of a stimulating fluid into the interval of the formation;
   inverting the radial invasion to obtain an input and entering the input into an effective medium model;
   solving the effective medium model and generating an effective wormhole radius profile and thickness for the interval of the formation;
   estimating wormhole density within an effective wormhole radius from a borehole image log;
   estimating an average wormhole diameter as a function of depth for the interval of the formation; and constraining the inverted radial invasion in the effective medium model.

2. The method of claim 1, further comprising:
   transitioning the borehole to production and producing hydrocarbons from the borehole.

3. The method of claim 1, wherein obtaining at least one resistivity log of the interval of the formation comprises obtaining a first resistivity log prior to stimulating the interval of the formation and obtaining a second resistivity log subsequent to stimulating the interval of the formation; and wherein determining a radial invasion of the stimulating fluid into the interval of the formation comprises comparing the first resistivity log with the second resistivity log.

4. The method of claim 3, wherein the first resistivity log is obtained from a pilot well or lateral well.

5. The method of claim 1, further comprising:
characterizing the effective wormhole radius as having an overall wormhole type selected from a group consisting of face dissolution, conical, and dominant.

6. The method of claim 1, further comprising:
estimating wormhole density within the effective wormhole radius from a borehole image log.

7. The method of claim 1, further comprising:
establishing an empirical correlation between the generated effective wormhole radius and thickness and productivity enhancement for the formation; and
estimating a productivity enhancement from a stimulating treatment.

8. The method of claim 1, wherein the resistivity logging tool measures in real-time.

9. The method of claim 8, wherein the resistivity is monitored at a fixed depth as a function of time.

10. The method of claim 1, wherein the resistivity tool is an array induction imaging tool.

11. The method of claim 1, wherein determining a radial invasion of the stimulating fluid into the interval of the formation comprises comparing the at least one resistivity log with a second log obtained prior to stimulating the interval, wherein the second log is an output from a logging tool selected from a group consisting of: acoustic tools, dielectric tools, gamma ray tools, and neutron tools.

12. The method of claim 11, wherein the resistivity tool is configured on a drill string.

13. The method of claim 11, wherein the resistivity tool is configured on a coiled tubing.

14. A method, comprising:
emplacing a resistivity logging tool in a borehole;
stimulating an interval of a formation;
logging resistivity with the resistivity logging tool at a depth of interest from a first time point to a second time point during stimulating the interval of the formation;
determining a radial invasion of a stimulating fluid into the interval of the formation;
inverting the radial invasion to obtain an input and entering the input into an effective medium model;
solving the effective medium model and generating an effective wormhole radius profile and thickness along the interval of the formation;
estimating wormhole density within an effective wormhole radius from a borehole image log;
estimating an average wormhole diameter as a function of depth for the interval of the formation; and constraining the inverted radial invasion in the effective medium model.

15. The method of claim 14, further comprising:
transitioning the borehole to production and producing hydrocarbons from the borehole.

16. The method of claim 14, further comprising:
characterizing the effective wormhole radius as having an overall wormhole type selected from a group consisting of: face dissolution, conical, and dominant.

17. The method of claim 14, further comprising:
establishing an empirical correlation between the generated effective wormhole radius and thickness and productivity enhancement for the formation; and
estimating a productivity enhancement from a stimulating treatment.

18. A system comprising:
a resistivity logging tool disposed in a borehole during a stimulating operation;
a processor carried on the logging tool configured to:
log resistivity with the resistivity logging tool at a depth of interest from a first time point to a second time point during stimulating an interval of a formation;
determine a radial invasion of a stimulating fluid into the interval of the formation;
invert the radial invasion to obtain an input and entering the input into an effective medium model;
solve the effective medium model and generate an effective wormhole radius and thickness for the interval of the formation;
estimating wormhole density within the effective wormhole radius from a borehole image log;
estimating an average wormhole diameter as a function of depth for the interval of the formation; and constraining the inverted radial invasion in the effective medium model.

\* \* \* \* \*